US009721041B2

(12) United States Patent
Lock et al.

(10) Patent No.: US 9,721,041 B2
(45) Date of Patent: Aug. 1, 2017

(54) CONFIGURABLE DATA ANALYSIS USING A CONFIGURATION MODEL

(71) Applicants: Hendrik C. R. Lock, Linkenheim-Hochstetten (DE); Stefan Jetter, Dielheim (DE); Oliver Rooke, Heidelberg (DE)

(72) Inventors: Hendrik C. R. Lock, Linkenheim-Hochstetten (DE); Stefan Jetter, Dielheim (DE); Oliver Rooke, Heidelberg (DE)

(73) Assignee: SAP SE, Walldorf (DE)

( * ) Notice: Subject to any disclaimer, the term of this patent is extended or adjusted under 35 U.S.C. 154(b) by 392 days.

(21) Appl. No.: 14/601,335

(22) Filed: Jan. 21, 2015

(65) Prior Publication Data

US 2016/0210373 A1   Jul. 21, 2016

(51) Int. Cl.
 G06F 17/30 (2006.01)
(52) U.S. Cl.
 CPC .............................. G06F 17/30991 (2013.01)
(58) Field of Classification Search
 CPC ......... G06F 17/30991; G06F 17/30994; G06F 17/30979; G06F 17/30988
 USPC ................ 707/659, 716, 769, 771, 805, 810
 See application file for complete search history.

(56) References Cited

U.S. PATENT DOCUMENTS

| 7,617,185 | B2* | 11/2009 | Werner ............. G06F 17/30991 |
| 7,689,567 | B2 | 3/2010 | Lock et al. |
| 7,761,474 | B2 | 7/2010 | Lock et al. |
| 7,788,644 | B2 | 8/2010 | Koduru et al. |
| 7,912,875 | B2* | 3/2011 | Gosper ............. G06F 17/30643 707/805 |
| 8,073,434 | B2 | 12/2011 | Lock et al. |
| 8,266,104 | B2 | 9/2012 | Lock et al. |
| 8,509,751 | B2 | 8/2013 | Lock et al. |
| 8,713,368 | B2 | 4/2014 | Lock |
| 2009/0024558 | A1 | 1/2009 | Brethauer et al. |
| 2011/0276562 | A1* | 11/2011 | Madden-Woods G06F 17/30991 707/722 |
| 2012/0303580 | A1 | 11/2012 | Lock et al. |
| 2014/0280042 | A1 | 9/2014 | Lock et al. |
| 2015/0026120 | A1* | 1/2015 | Chrapko ................. G06Q 50/01 707/609 |

(Continued)

*Primary Examiner* — Greta Robinson
(74) *Attorney, Agent, or Firm* — Fish & Richardson P.C.

(57) ABSTRACT

The disclosure generally describes computer-implemented methods, software, and systems, including a method for presenting information. A command is identified from an application, the command associated with a configuration model. The identified command is matched to a step defined within the configuration model, each step in the configuration model associated with a request to a particular backend system, wherein each request is associated with at least one representation, the representation defining a visualization associated with the results returned in response to the request. The requested step is added to an analysis path, the analysis path storing a series of ordered steps performed during execution of the application. The request associated with the added step is executed including sending the request to the particular backend system for execution, and the analysis path is updated. A representation object is generated in response to executing the request.

20 Claims, 8 Drawing Sheets

(56) References Cited

U.S. PATENT DOCUMENTS

| | | | |
|---|---|---|---|
| 2015/0286690 A1* | 10/2015 | Hu | G06F 17/3089 707/722 |
| 2016/0103886 A1* | 4/2016 | Prophete | G06F 17/30994 707/722 |
| 2016/0162539 A1* | 6/2016 | Yun | G06F 17/30398 707/771 |

* cited by examiner

CONFIGURABLE DATA ANALYSIS USING A CONFIGURATION MODEL

BACKGROUND

The present disclosure relates to information presentation.

Analytical applications can require a high degree of extensibility and flexibility for development and customer adaptation. For example, in order to present specialized information that a customer needs, developers may have to write additional code or provide other services.

SUMMARY

The disclosure generally describes computer-implemented methods, software, and systems for presenting information. For example, a command is identified from an application, the command associated with a configuration model. The identified command is matched to a step defined within the configuration model, each step in the configuration model associated with a request to a particular backend system, wherein each request is associated with at least one representation, the representation defining a visualization associated with the results returned in response to the request. The requested step is added to an analysis path, the analysis path storing a series of ordered steps performed during execution of the application. The request associated with the added step is executed including sending the request to the particular backend system for execution and updating the analysis path. A representation object is generated in response to executing the request.

The present disclosure relates to computer-implemented methods, software, and systems for presenting information. One computer-implemented method includes: identifying a command from an application, the command associated with a configuration model; matching the identified command to a step defined within the configuration model, each step in the configuration model associated with a request to a particular backend system, wherein each request is associated with at least one representation, the representation defining a visualization associated with the results returned in response to the request; adding the requested step to an analysis path, the analysis path storing a series of ordered steps performed during execution of the application; executing the request associated with the added step including sending the request to the particular backend system for execution and updating the analysis path; and generating a representation object in response to executing the request.

In some implementations, access to information needed by a customer can be facilitated using concepts and services associated with a configuration model and a processor for configurations. For example, analytical applications can be based on an interaction paradigm associated with an analysis path. The use of this concept and subsequent approach permits a one-time implementation of a processor, and application-specific semantics are delegated into the development of a configuration. The approach includes the use of semantics that consist of analytical queries and mappings of query results to graphical representations.

Using this approach, applications that are created can use a combination of a processor, a single configuration, and some optional application-specific coding. The processor itself can represent a generic analytical application which is dynamically instantiated each time through a different configuration that is identified by a key, for example. Extensibility (e.g., that is coding-free) is achieved through use of the configuration, that is, by changes to the configuration. The configuration process itself is strongly domain-specific and hence can be supported by tailored modeling tools.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the method further includes, prior to identifying an initial command from the application, creating an empty analysis path and setting an initial context.

In a second aspect, combinable with any of the previous aspects, wherein prior to executing the request associated with the added step, executing requests associated with each of the preceding steps in analysis path.

In a third aspect, combinable with any of the previous aspects, wherein executing each of the preceding steps in the analysis comprises executing the preceding steps in order from the first step in the path to the added step.

In a fourth aspect, combinable with any of the previous aspects, wherein one or more steps in the analysis path includes one or more filters determined by the representation object, and wherein the method further comprises, prior to executing the request, retrieving a filter from the representation.

In a fifth aspect, combinable with any of the previous aspects, wherein added steps are executed using filters associated with preceding steps in the analysis path.

In a sixth aspect, combinable with any of the previous aspects, the method further includes: receiving a request to move a particular step to a new location in the analysis path; updating the order of the analytical path based on the request to move the particular step; and re-executing the requests associated with each step in order beginning with the first step in the analysis path.

The subject matter described in this specification can be implemented in particular implementations so as to realize one or more of the following advantages. First, users can perform drill-down and other operations without coding changes. Second, an analysis path processor can be used to make requests of a backend while supporting visualizations presented to a user in an application. Third, representations can be implemented as part of the application and may produce any domain specific visualization of data. Fourth, user selections on the visualization of those representations can be mapped back to filters in a generic way. Thus, the application can stay completely ignorant of the request logic, e.g., if each representation implements a specific interface required by the processor, as described below.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
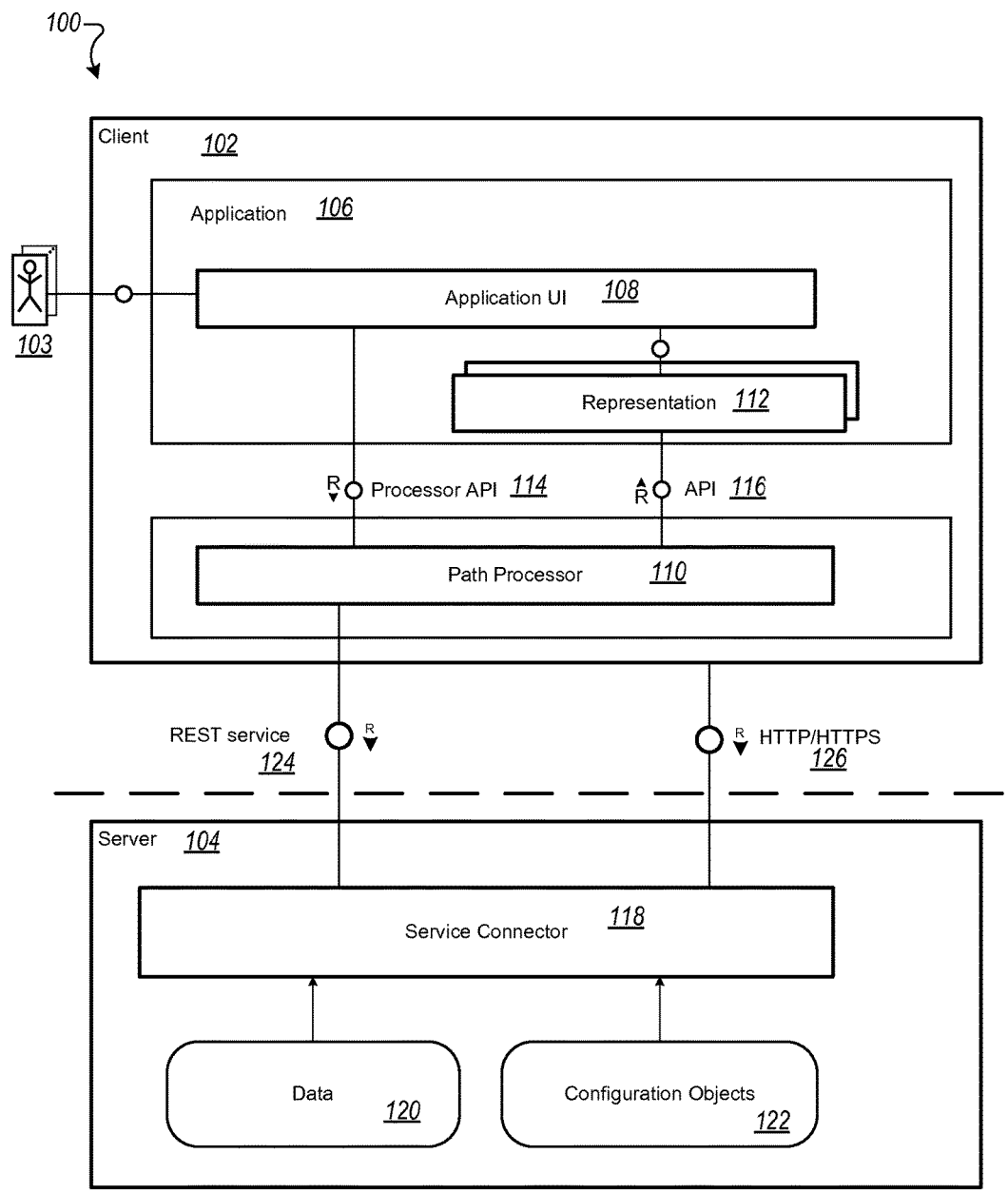
FIG. 1 is a block diagram of a system 100 for presenting information using configuration models.

This disclosure generally describes computer-implemented methods, software, and systems for presenting information. For example, information can be presented using a system that is based on an approach using configuration models. The system includes the use of a path processor that provides an interaction paradigm of an analysis path. The path processor, for example, can include and/or use a reusable library that supports applications in processing an analysis path. An analysis path can allow a user, for example, to drill down step-by-step in different dimensions and views while reducing the amount of information, until a conclusion can be drawn. This can occur, for example, on large data sets, using filters and/or other techniques to reduce the amount of information presented to the user. A filter, when used herein, can be a logical expression that is constructed of conjunctions and disjunctions over equalities or inequalities between property names and values. A logical expression, when used herein, can be constructed of equalities or inequalities between property names and values.

The path processor can support a sophisticated user interaction paradigm that supports specific analytical applications (e.g., web applications). As an example, a user can perform a step-by-step analysis of key performance indicators (KPIs) by looking at KPI-associated information from different perspectives. For example, the user can compare a KPI (e.g., sales) across different countries and/or customers, and the user can further examine tendencies or trends over time. To support this analysis, different analysis steps can be defined for user selection in a user interface (UI), e.g., from an analysis step gallery. In some implementations, analysis steps can include the presentation of data depicted, through the user interface, in various types of representations, such as charts. A chart, when used herein, can be any UI graphical chart or some other element displaying data in any number of dimensions, supporting user interaction through data selection. Example charts include an instance of a map (e.g., a choropleth map), a pie chart, a column chart, a line chart, a scatter plot, or some other presentation of data from which the user can make a selection. Representations, when used herein, can include any object defining a specific API (e.g., a façade pattern) and wrapping/presenting a chart. The object maps the API, required by the processor, to some specific chart implementation. The API can define methods for setting data, retrieving a filter, serialization, and de-serialization of the chart.

In each analysis step, the user can select data to filter the information provided in subsequent steps. By combining different analysis steps and applying filters, for example, the user can interactively create one or more customized flexible analysis paths. An interaction paradigm using the applications can be summarized as follows. Analysis settings are defined that include, for example, one or more of an analysis time frame, a company code, a reporting currency, and/or other parameters and characteristics. An analysis step is selected by the user, e.g., from a category in the analysis step gallery. In some implementations, the analysis step gallery can include a visualization of the configuration objects from which a user can choose a (visualization of a) step prototype. In the representation of the analysis step, for example in a chart or a table, the user selects data as required to filter the information that is provided in subsequent steps. The user can add further analysis steps to get more detailed information. To refine the analysis, the analysis steps can be re-ordered, new steps can be added, or individual steps can be deleted as required. The analysis path can then be saved.

A system based on the configuration model approach can, for example, solve major shortcomings of conventional analytics applications (e.g., for financial documents) that lack extensibility and flexibility. For example, conventional analytics applications may not allow users (e.g., customers) to adapt the applications to their specific needs without significant effort (e.g., coding). Also, the underlying functional concepts cannot be easily applied to other business areas, e.g., logistics, sales, or other areas. However, using the system based on the configuration model approach, extensibility issues can be resolved. Further, a user can extend the analysis to other services (e.g., new services or the customer's services) and entity types. Services, when used herein, can include open data protocol (e.g., OData) services. An entity type, when used herein, can be the name of the signature of an OData entity that corresponds to a view, e.g., a table view.

In some implementations, the system can provide the following extensibility features. A user can extend existing entity types by adding new properties. A user can display new services, entity types and properties in given chart types. A user can extend the range of given chart types by introducing new types. A user can change the set of given analysis steps of an application. A user can change the binding of entity sets to charts, and the mapping of the UI selections in charts to filter expressions of a service request. An entity set, when used herein, can be (or can be identified by) the name of a typed response, whose type is defined by an associated EntityType (e.g., of the same of a related name, such as in RevenueQueryResults and RevenueQueryResultType). A request, when used in this context, can be an OData request from a client to a server. A request, when used herein for other contexts, can be a request term in a configuration, or a request object at runtime.

One central concept of the system based on the configuration model approach is creating extensibility through the use of a configuration model. For example, a configuration can be represented by (but not limited to) a JavaScript Object Notation (JSON) model or some other data interchange format. Other formats that are possible include a document format such as XML, a relational database(s) schema, and any object serialization (such as JSON). A configuration, when used herein, can be either the root term of an instance of the configuration model, e.g., that is a configuration itself, or an entity such as a file or table row containing a root term. The configuration model defines terms covering the above topics. A runtime data model can correspond to the configuration model. A processing component, e.g., of a path processor, can load the configuration, create the runtime data model, and interpret the runtime data model in the context of user commands. The path processor can dynamically build and update an analysis path, send requests to a server, and process responses, e.g., including sending data that supports user interface representations (e.g., charts). The path processor can also receive selection filters from user interface representations (e.g., as part of user interactions with charts), apply filters to requests, determine changes to the analysis path, and re-send changed requests. The path processor can further store and retrieve analysis paths on the server. In some implementations, the path processor can be hosted on a client device (e.g., in a web browser), and can communicate using an open data protocol (e.g., OData) with the server. The server can provide analytical processing functionality and data service provisioning.

In some implementations, the system can provide the ability to express each member of a specific family of analytical applications solely through a single configuration, e.g., an instance of the aforementioned configuration model. The system can also process that configuration using a generic processing component. Thus, the path processor needs only to be implemented, delivered and maintained once, and analytical applications of the specific family can be independently developed. For example, a specific family may correspond to information associated with a single KPI or a particular set of KPIs.

In some implementations, the path processor can be developed as a library component and re-used by many applications, e.g., each in combination with its own analytical configuration, such as a file or a database table. In some implementations, the path processor can be developed as a generic multi-instance-capable application, e.g., loading its analytical configuration via a key from a database table.

The ability to express the entire semantics of the application through configuration terms can provide a required extensibility for customers. Each required extensibility feature can be covered simply by providing a configuration term expressing the corresponding feature. For example, terms that are provided can include terms for a request, a step, and a binding of one or more charts.

A family of the aforementioned analytical applications can be characterized by the following. Interaction logic is used to dynamically build a path of one or more analytical steps, where each step depends on all preceding steps. Each analytical step in the path dynamically determines a filter, e.g., identified through UI interaction. Each filter is applied in conjunction with the filters of all preceding steps, e.g., for automatic propagation to queries belonging to the next steps in the path. In this way, the analytical applications can provide multi-dimensional drilldown, multi-level drilldown (e.g., defined by the path), and multi-view drilldown (e.g., using multiple views and filters on common attributes).

FIG. 1 is a block diagram of a system 100 for presenting information using configuration models. The system 100 has a two-tier architecture: a client 102 that includes a path processor 110 that communicates (e.g., using HTTP requests) with a server 104. The server 104 can provide some level of analytical processing. Detailed functions of the path processor 110 are included below with reference to FIG. 3.

The client 102 includes an application 106 (e.g., a web application) that instantiates the path processor 110, which processes configurations associated with analysis paths. The path processor 110 exposes an API to the application 106. The API supports all configured analysis steps for creating and adding step instances to the analysis path, and for evaluating the path and its steps. As a result, requested data gets displayed by the application 106, e.g., in UI visualizations, such as charts.

Application 106 supports user interaction and provides an application user interface (UI) 108. Using the application 106, a user 103 can set up consistent operations associated with a configuration. The application 106 includes high-level application code that defines application flow that is associated with one or more steps from the configuration. The path processor 110 then manages the path and prior filters to make sure filters are maintained along a path (e.g., which essentially turns general operations into stateful ones).

One example mode of operation includes the application 106 propagating user actions to the path processor 110, which then triggers backend requests to the server 104, and responses from the requests are passed to a representation runtime object. In this way, the path processor 110 shields the application 106 from service requests, allowing the application 106 to be decoupled, at a request level, from data at the server 104.

The path processor 110 manages the path (e.g., including runtime objects), implements path logic, forms service requests to the server 104, and processes responses received from the server 104. The path processor 110 knows how to translate, at runtime, information from a runtime object model to make requests to the server 104. The path processor 110 also returns results from the server 104 to support and build representations 112.

During processing, e.g., during execution of the runtime object model, the path processor 110 makes sure to maintain a current state. For example, the path processor 110 insures that filters that were previously applied are used, as needed, with each request. Filters, when used in this way, essentially act as "wherein" SQL clauses (e.g., wherein company="Coca-Cola"), used to filter data between steps.

Representations 112 are implemented as adapters between applications (e.g., for visualization and/or processing) and the path processor 110. Towards the path processor 110, all representations can be implemented using a common API.

Using a processor API 114, the application 106 processes user requests, such as actions that create, move or remove a step; retrieve a path and its steps; or read step prototypes (e.g., using a method ReadStepPrototypes). For example, operations provided by the processor API 114 include basic actions such as createStep, moveStep, removeStep, update-Path, readStepPrototypes, and readPath. Configuration objects (e.g., stepPrototypes) can be identified via unique keys.

Using an API 116, the path processor 110 sends data to the application 106 through representation objects. The path processor 110 requests filters through representations. For example, the path processor 110 retrieves filters using the API 116, and the filters are mappings of the selections in the UI. Runtime objects associated with an analysis path can be maintained inside the path processor 110, such as included in data 120. Each analysis path is accessed by its root object. Once an analysis path is created, the analysis path can be manipulated and retrieved through the processor API 114. In some implementations, the server 104 includes a service connector 118 that handles requests and provides a connection for services associated with data under control of the server 104, e.g., the data 120 and the configuration objects 122. Using the API 116, the path processor 110 can request the filter of a preceding step from the representation associated with that step. The representation can map the user input (e.g., data selections) on visualizations to a filter (e.g., object). The filter can be expressed over the requested filter properties (e.g., which are defined in the binding and known to the representation via the binding).

The configuration objects 122 specify objects that can be created at runtime through the API. The configuration objects 122 include configuration content that is static and relates to models described herein. Using a service interface 124, the path processor 110 sends service requests to the server 104, e.g., to retrieve analytical data. The client 102 can also make requests of the server 104 through an HTTP/HTTPS interface 126.

In one example scenario, the user 103 can use the system 100 obtain information related to KPIs (e.g., revenue) associated with a scatter graph. When the scatter graph is displayed, for example, the user 103 can designate that a top-right rectangle, e.g., representing the highest-performing entities (e.g., companies), is to be processed further. From there, using the top-performing companies, the user 103 may select a particular region in the world, such as from a map or other visualization. From there, the user may select one or more products from a spreadsheet that is associated, for example, with a top-performing company in South America. When performing these steps, the user 103 may at any time move one of the filters (e.g., top-performing, selection by geography, particular products) to earlier in the sequence of operations.

Figure 2:
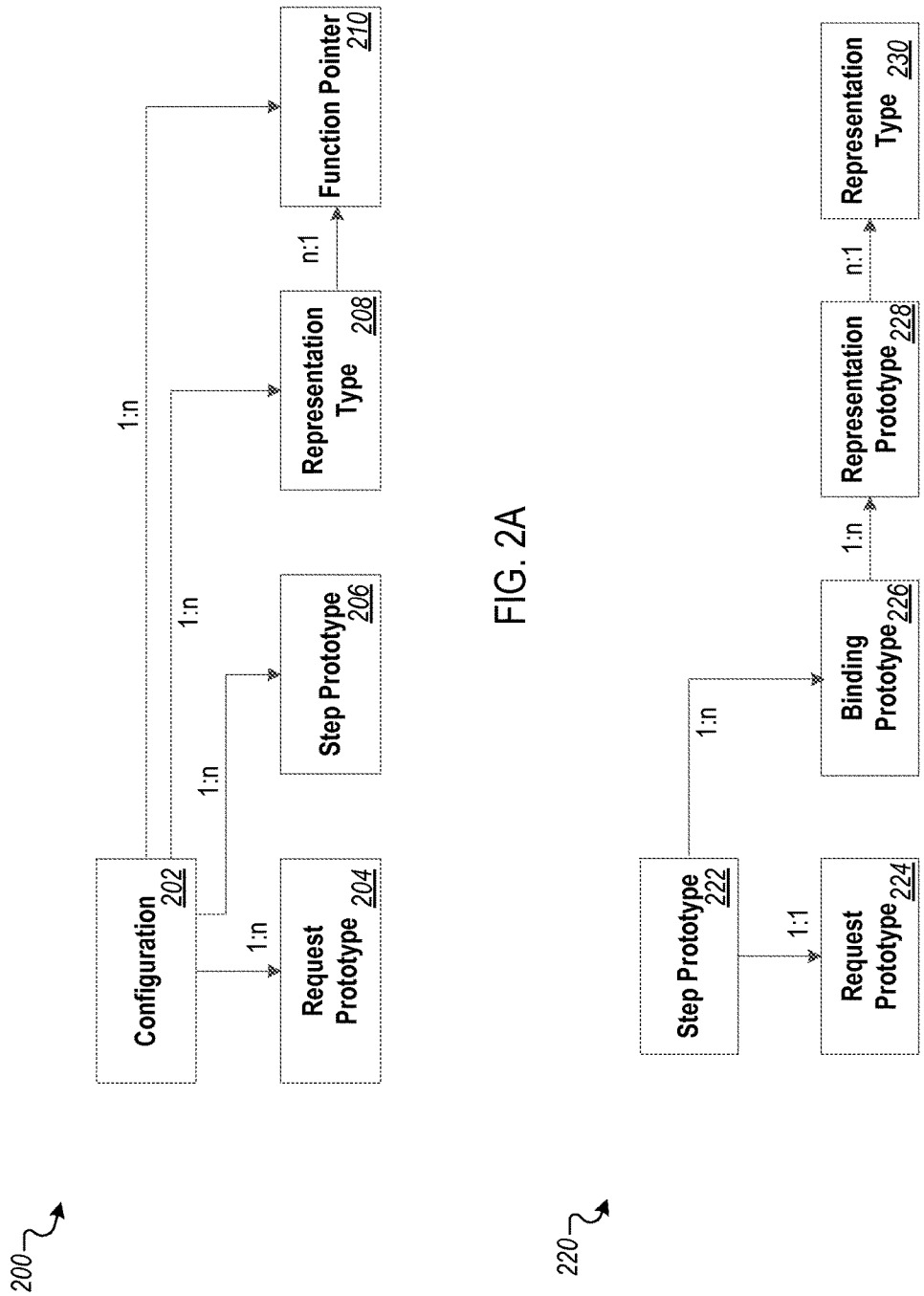
FIG. 2A is a diagram of an example configuration model.
FIG. 2B is a diagram of an example step prototype representation that is associated with the configuration model.

FIG. 2A is a diagram of an example configuration model 200. For example, the configuration model 200 includes a configuration 202 that has a 1:n relationship with a request prototype 204 (e.g., defining prototypical elements of a particular request), a step prototype 206 (e.g., defining prototypical elements of a particular step), a representation type 208 (e.g., for a type of representation, such as a chart), and a function pointer 210 (e.g., for a particular function to be executed relative to the step).

A configuration (e.g., the configuration 202) consists of several term lists. Each term defines a run-time object that can be instantiated zero or many times. A configuration includes a list of one or many step terms. A configuration also includes a list of one or many request terms, each request defining a service, an entity set, and the selected properties. A configuration also includes a list of one or many representation type terms, each representation type defining the function pointer of the chart implementation and additional metadata such as labels, texts and icons. A configuration also includes a list of one or many category terms, each category providing a classification system for steps. For example, the category "Time" categorizes all steps that analyze dates and/or other time information over a time dimension.

FIG. 2B is a diagram of an example step prototype representation 220 that is associated with the configuration model. For example, the step representation 220 defines an object schema for configuration objects. The step representation 220 includes a step prototype 222 that essentially defines a binding prototype 226 between a micro-model and many graphical representations (e.g., one or more representation prototypes 228 and associated representation types 230). A request prototype 224 associated with the step prototype 222 defines a micro-model (a client-side view) through the selected properties of a specific entity set of a service. A micro-model, when used herein, can include a view defined by a service, an entity set, and selected properties (e.g., OData properties). Since the corresponding derived request defines a query, this query in turn determines an analytical view which essentially is a model. The micro-model also motivates a model binding between a request and a chart. For example, the model binding describes how selected properties are mapped to chart dimensions and how data selection in the chart is mapped back to required filter properties. The selected properties, when used herein, can include properties of a request in the select query option of a request. The selected properties are naturally a subset of the properties of the EntityType of the requested EntitySet. Although generating a representation can be specific to adding a step, generation of a representation can also occur when updating a path (e.g., after move or remove commands). The generated representation can carry the response data to the application/visualization, and can create the filter on demand, e.g., as part of API 116.

In the binding between the micro-model and the many graphical representations, binding terms can specify the representations and the required filter properties plus metadata. The required filter properties, when used herein, can define a rule for the representation regarding how to map selections to filters of the API 116. For example, the required filter properties can include one or many properties over which a filter will be formed as a result of a selection in a chart. These properties are a subset, for example, of the selected properties of an EntitySet (e.g., which are properties of the micro model). A representation defines a specific mapping of the micro-model to a chart and its dimensions. The representation type associated with the representation specifies the chart and its metadata.

Figure 3:
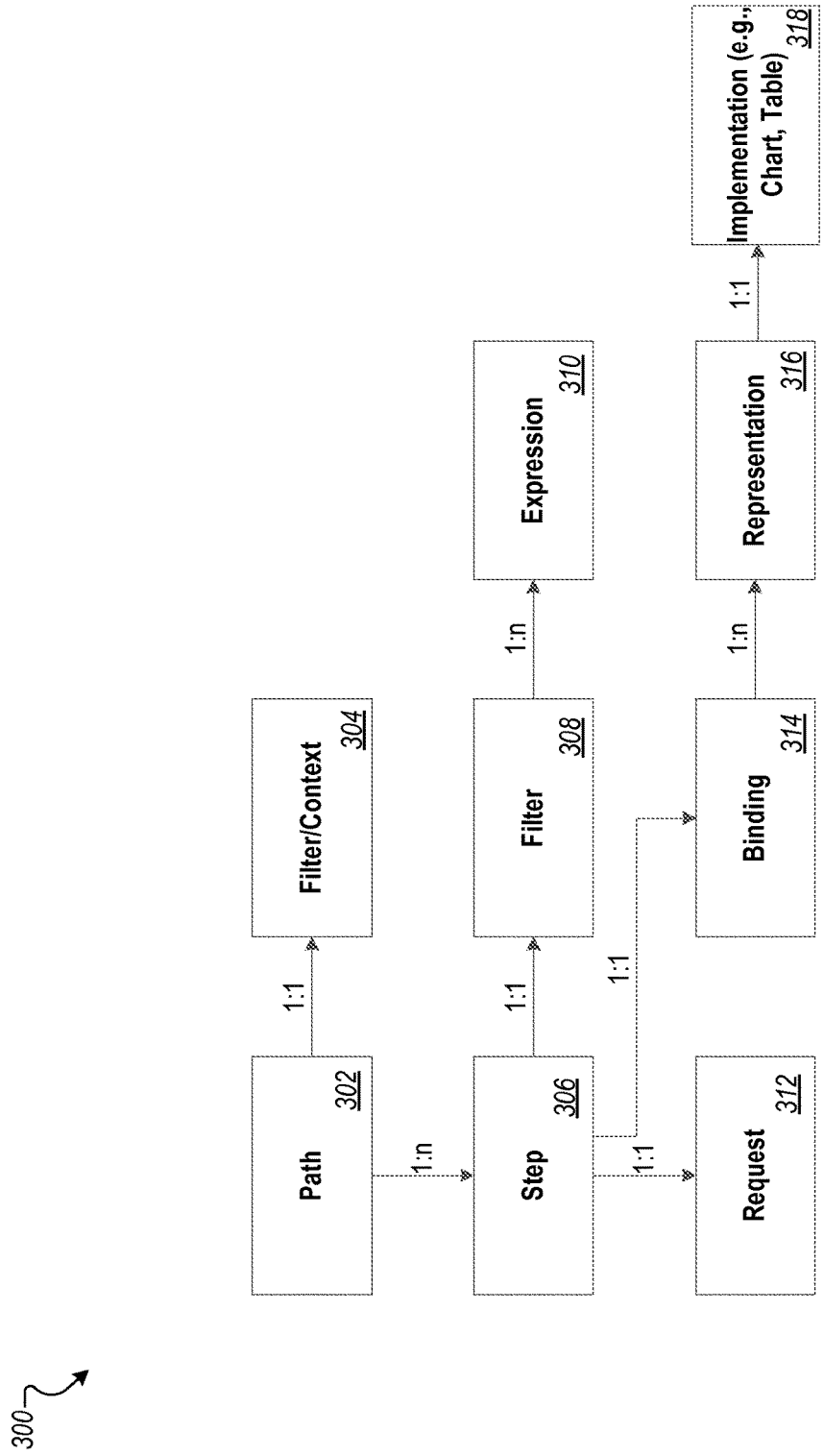
FIG. 3 is a diagram of an example run-time configuration model.

FIG. 3 is a diagram of an example run-time configuration model 300. The run-time configuration model 300 is used by the path processor 110 in order to represent the current state of a path (e.g., path 302) and all of its steps (e.g., steps 306). Run-time objects associated with the object model include several elements, described below.

The path, for example, is an ordered sequence of one or more steps. Steps can be added to the path, removed from the path, or moved to a different position in the path 302. The path optionally includes a start filter/context 304 which can be set by the calling context of the processor. The path manages the flow of control along the path whenever changes occur to the path. In some implementations, a method updatePath can be used to update the path.

A step, for example, can be created from a step term. The step manages the flow of control and data between the path, the request, and the step itself.

A filter (e.g., a filter 308), for example, is created for use with the chart associated a given step (e.g., the step 306). The filter represents the selections of the chart, e.g., built with conjunctions and disjunctions over basic filter expressions (e.g., expression 310). A filter can be directly mapped to an OData filter query option. A query, when used herein, is a synonym for an OData request for analytical processing.

A request (e.g., request 312), for example, is an OData request from the client 102 to the server 104. The request manages the application of filters applied to a step (e.g., the request 312), the request response semantics to the server, and passing response data to the step and associated active representation. The request is also responsible for forming the request URI for a request.

A binding (e.g., binding 314), for example, is created by the steps (e.g., the steps 306). The binding is responsible for connecting the step with its representation(s) (e.g., representations 316). The binding is also responsible for determining the currently active representation and connecting the active representation with the step and request. The binding further defines the required filter properties, and passes that information to the representation.

A representation, for example, can be or include an underlying structure that supports a visualization of data (e.g., a chart) to the user. A representation can include any object defining a specific API (e.g., a façade pattern) and wrapping/presenting a chart. The object can map the API, required by the processor, to a specific chart implementation (e.g., implementation 318, such as a chart or table). The API can define methods for setting data, setting the required filter properties, retrieving a filter, serialization, and de-serialization of the chart. The representation can define an adapter between the API (e.g., that the path processor requires) and the chart implementation. The representation can access the chart implementation through the function pointer of the associated representation type. The representation is responsible for passing and transforming data received from the request to the chart, and mapping selections of the chart back to filter expressions when requested by the request.

The run-time configuration model 300 can be processed by the path processor 110. In some implementations, before processing can occur, setup steps of the path processor 110 include, for example, loading the configuration, creating an empty path, and optionally applying context (e.g., using a setContext method). Once the path processor 110 is initialized, the path processor 110 can wait for user-related activities. Example user activities include user selection and creation of a step (e.g., entailing invocation of methods createStep and then updatePath), user selections on a chart (e.g., entailing invocation of method updatePath), and/or user re-ordering (moving) of a step to rearrange the path (e.g., entailing invocation of method updatePath).

During processing of runtime objects, e.g., after calling updatePath, the path processor 110 executes several tasks while going through all steps in the order of their positions in the analysis path. Data requests associated with the step are executed to make requests of the server 104. The path processor 110 supplies the active representation object of the steps with the response data. The application UI is notified so that it can refresh. In addition, the path processor 110 accumulates filters that are derived from user selections made in representations, and the path processor 110 applies those filters in subsequent OData requests.

Steps in the path are processed in the order of their positions in the path. For example, the first step is processed first. The filter resulting from the first step is then used to process the second step, and so on.

Variables used in processing an analysis path are described in the following table:

TABLE 1

Analysis Path Processing Variables

| Variable | Description |
|---|---|
| $S_1, \ldots, S_n$ | Path of length n |
| $S_i$ | Step |
| $R_i$ | Request for step $S_i$ |
| $B_i$ | Binding for step $S_i$ |
| $RO_{is}$ | Selected representation object for step $S_i$ |
| $F_i$ | Filter object associated to step $S_i$ |

TABLE 1-continued

Analysis Path Processing Variables

| Variable | Description |
|---|---|
| $F_0$ | Context filter of a path. This context filter is either empty, or the context filter is set by the API method setContext(<filter>). This filter defines the OData filter for request $R_1$ of step $S_1$. |

During processing, the path processor 110 can start with processing the first step of the path, $S_1$. The processing of step S begins with requesting the filter $F_{i-1}$ of the previous step. Note that for step $S_1$, this is the context filter $F_0$. Step $S_i$ is further processed by sending a data request $R_i$ to the server. The filter expression of request $R_i$ is defined by the previous filter $F_{i-1}$. When request $R_i$ returns successfully, the associated response data is used in the selected representation object $RO_{is}$. This representation object then creates its own filter based on this data and its own UI selections. This filter can be requested when processing the subsequent step. The filter $F_i$ is defined as a conjunctive accumulation of the previous filter $F_{i-1}$ and the filter defined by the selected representation object ($RO_{is}$). The filter $F_i$ is used for processing step $S_{i+1}$.

When the processing of step $S_i$ is completed, the logic passes back control to the method updatePath( ) of the path processor. The processor then continues with the subsequent step $S_{i+1}$ or stop when $S_i$ is the last step.

In some implementations, API methods (e.g., for the processor API 114) can include the following methods. A setContext method, for example, can associate a start filter to the path, which becomes applied as a filter for the request of the first step in the path. A createStep method, for example, can create a step and append the step to the path. An updatePath method, for example, can process the entire path and re-compute the path's filters and requests. This method can be used, for example, by a UI when a user has changed selections in a representation (e.g., a chart). Additional methods can expose a description of a step to the application UI so that the user can select and create a step. Other methods can be used to access the path, steps in the path, and the filter of each step, e.g., so that the result of an analysis can be passed to the surrounding application.

Some implementations can use a JSON model to represent the configurations described with reference to FIGS. 2A and 2B. For example, configurations can include a configuration root object that is represented as:

```
{
    steps : [ <step>* ],
    requests : [ <request>* ],
    bindings : [ <binding>* ],
    categories : [ <category>* ],
    representationTypes : [ <representationType>*]
}
```

For the configuration root object, the notation [<type>*] indicates an array of one or more elements. From a root node, one or more step nodes can be accessed. In some implementations, a step object can be represented as:

```
{
    "id" : <id::string>,
    "request" : <request ID>,
    "binding" : <binding ID>,
    "categories" : [ <category ID>* ],
}
```

In some implementations, elements of the step object are described in the following table:

TABLE 2

Elements of Step Object

| Property | Description |
|---|---|
| Id | Unique ID of type string |
| Request | ID of the request used for this analysis step. |
| Binding | ID of the binding used for this analysis step. |
| Categories | ID of the categories in which the analysis step is displayed in the analysis step gallery. |

In some implementations, a request object can be represented as:

```
{
"id": <id::string>,
"service" : <service root>,
"entitySet" : <entity set name>,
"selectProperties" : [ <property name>* ],
}
```

The service root, when used herein, can be the universal resource identifier (URI) of a service (e.g., a service document), but omitting the schema, domain and port specification, that is a path suffix uniquely identifying the resource on some unspecified server. A property, when used herein, can be an entity of an EntityType that corresponds to an attribute of a view. Elements of a request object are described in the following table:

TABLE 3

Elements of Request Object

| Property | Description |
|---|---|
| Id | Unique ID of type string. |
| Service | Path to OData service root. The service root is defined by an absolute path on the OData server according to the following pattern: <service root>: " . . . /odata/<odata-service-document>" The request and its entity type are absolute to the service root, which starts after the server and port in-formation: [protocol]://[server]:[port]/<service root> |
| entitySet | Name of an entity set of the service |
| selectProperties | Set of property names. The selected properties determine the analytical processing, in particular, the aggregation semantics. |

In some implementations, a binding object can be represented as:

```
{
"id" : <id::string>,
"requiredFilters" : [ <property name>* ],
"representations" : [ <representation ID>* ]
}
```

In some implementations, elements of a binding object are described in the following table:

TABLE 4

Elements of Binding Object

| Attribute | Description |
|---|---|
| id | unique ID of type string |
| requiredFilters | Contract between binding and request; specify the target properties for converting selected data into filter expressions |
| representations | Defined in the representationobjects |

In some implementations, the binding object can have a default representation, e.g., containing an array of the attribute representations. In the array, for example, the first representation object (e.g., in position zero) can serve as the default representation, which can be displayed in the analysis step gallery.

In some implementations, a representation object can be represented as:

```
{
    "id" : <id::string>,
    "representationTypeId" : <representation type ID>,
    "parameter" :
    {
    "type" : "parameter"
    "dimensions" : [ <dimension>* ]
    "measures" : [ <measure>* ]
    }
}
```

In some implementations, elements of a representation object are described in the following table:

TABLE 5

Elements of Representation Object

| Property | Description |
|---|---|
| id | Unique ID of type string. |
| representationTypeId | ID of the representation type object, which contains a label, an image, and a reference to the constructor function of the representation type. |
| parameter | Defines specific information for the representation, for example, dimensions, and measures. At runtime, the constructor defined in the representation type object is called with the parameters defined by this property. |

In some implementations, in the representation object, dimensions and measures can have the same format:

```
"dimension" : {
    "fieldName" : <property name>
    "fieldDesc" : {
    "type" : "label",
    "kind" : "text",
    "key" : <key>
    }
}
```

In some implementations, a representation type object can be represented as:

```
{
    "id" : <id::string>,
    "constructor" : <constructor>,
    "label" : <label>,
    "picture" : "<path/file>",      // relative to Web application root
}
```

Elements of a representation type object are described in the following table:

TABLE 6

Elements of Representation Type Object

| Attribute | Description |
|---|---|
| id | Unique ID of type string. |
| constructor | Defines the implementing function object of the representation (e.g., a function pointer). |
| picture | Icon indicating the representation type. |
| label | Defines the label text. |

In some implementations, a category object defines categories of steps and can be represented as:

```
{
    "id" : <id::string>,
    "label" : <label>
}
```

In some implementations, a label object is a sub-object that defines a label text and can be represented as:

```
{
"type" : "label",    // optional
"kind" : "text",
"key" : <key> // text key related to resource file
}
```

Figure 4:
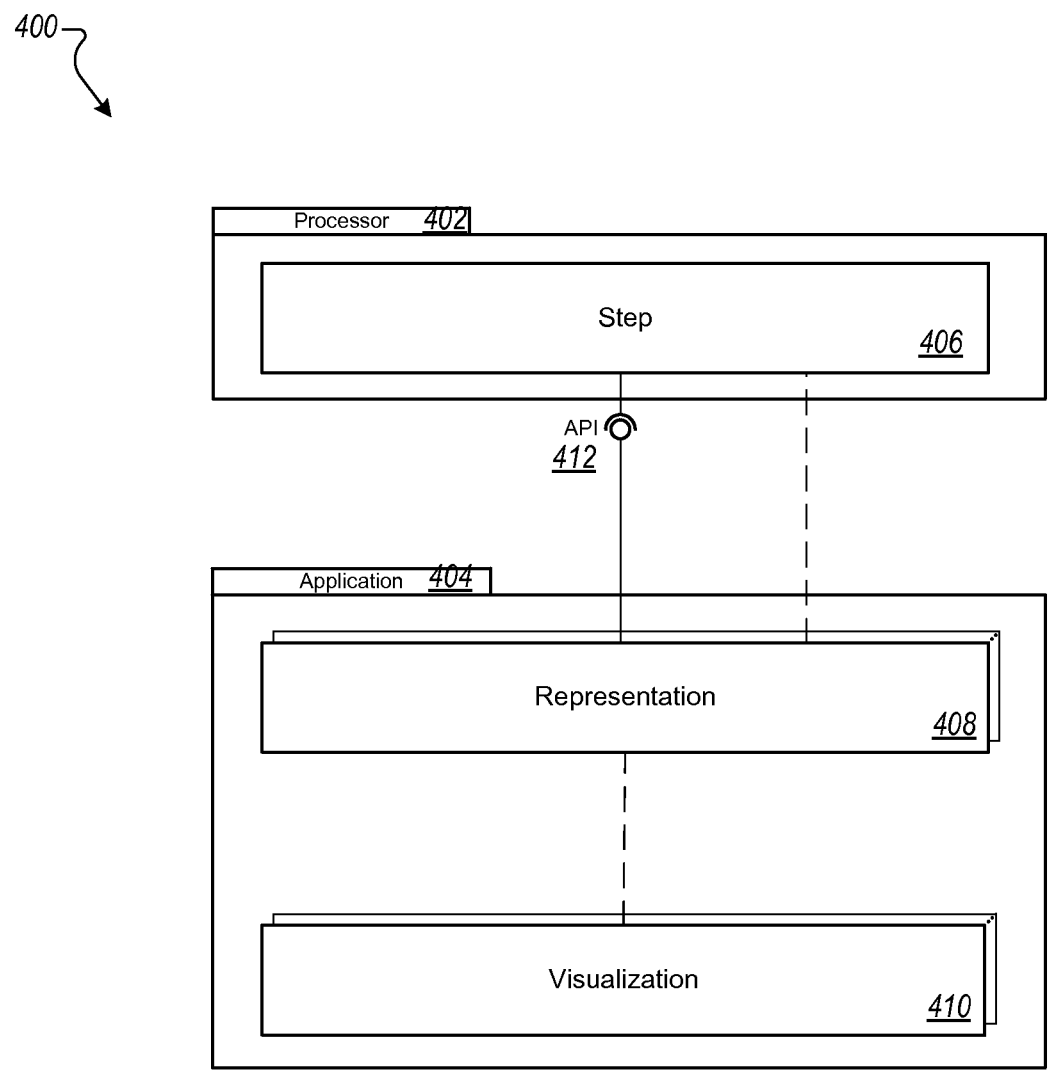
FIG. 4 is a block diagram of an example representation interface between a processor and an application.

FIG. 4 is a block diagram of an example representation interface 400 between a processor 402 and an application 404. For example, the representation interface 400 can be used when each representation runtime object (e.g., representation 408) implements a specific API (e.g., API 412). This API, when serving as a representation interface, can be part of an overall processor API (e.g., processor API 114). As such, the API can ensure that a processor 402 (e.g., part of the path processor 110) can communicate with an application (e.g., the application 106). The API enables communication of response data from the step (e.g., a step 406) to the application and includes retrieving filters from the application. Each runtime object step can reference one or more representation objects.

The representation object includes a link to an implementation that the application side (e.g., the application 404) visualizes. Further, the application processes data provisioned by the processor. As such, the representation is part of the application. The representation can be instantiated, for example, when creating a step. Instantiation can include the use of a function pointer of the representationType (configuration object). For example, the configuration object BindingPrototype describes how response data is being mapped to a visualization (e.g., a visualization 410). How the mapping occurs is the responsibility of the application.

The processor can expose the model (e.g., JSON model) of the configuration to the application. Hence, the model is part of the processor's API. A representation (e.g., the representation 408) owns one implementation instance (e.g., the visualization 410).

Figure 5:
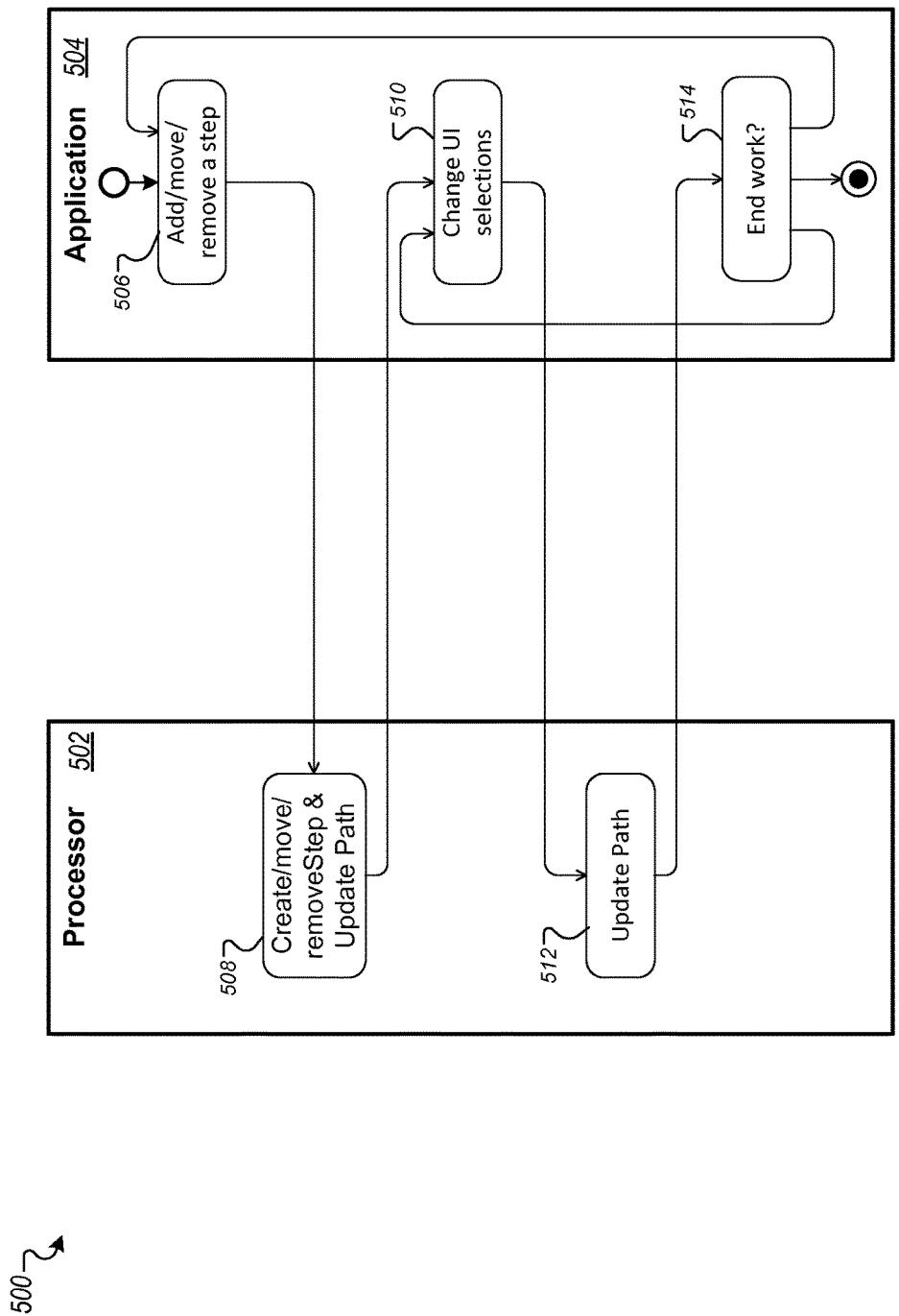
FIG. 5 is a flow diagram of path definition steps, including interactions between a processor and an application.

FIG. 5 is a flow diagram of path definition steps 500, including interactions between a processor 502 and an application 504. Processing can begin, for example, after the application 504 reads available step prototypes (e.g., provided using method StepPrototypes) from a particular configuration. At 506 (e.g., at the application 504), through a user selection in a UI, for example, the user of application 504 can choose a particular step from the available step prototypes. As a result, the application 504 can call, for example, a createStep method for that step prototype, the call using the processor API (e.g., API 412). At 508, the processor 502 can create a step instance and append the step to the path. During creation of the step instance, the processor 502 can also create a binding of representation objects to the step according to the configuration specified in the binding configuration object of that step prototype. Each representation object is created by calling the specified function pointer. At 510, at the application 504, UI selections corresponding to path changes can be processed, e.g., if the user changes the path. At 512, at the processor 502, the path is updated (e.g., using the method updatePath). User inputs on the application 504 can continue, with path updates being processed by the processor 502, until the user is done working at 514.

Figure 6:
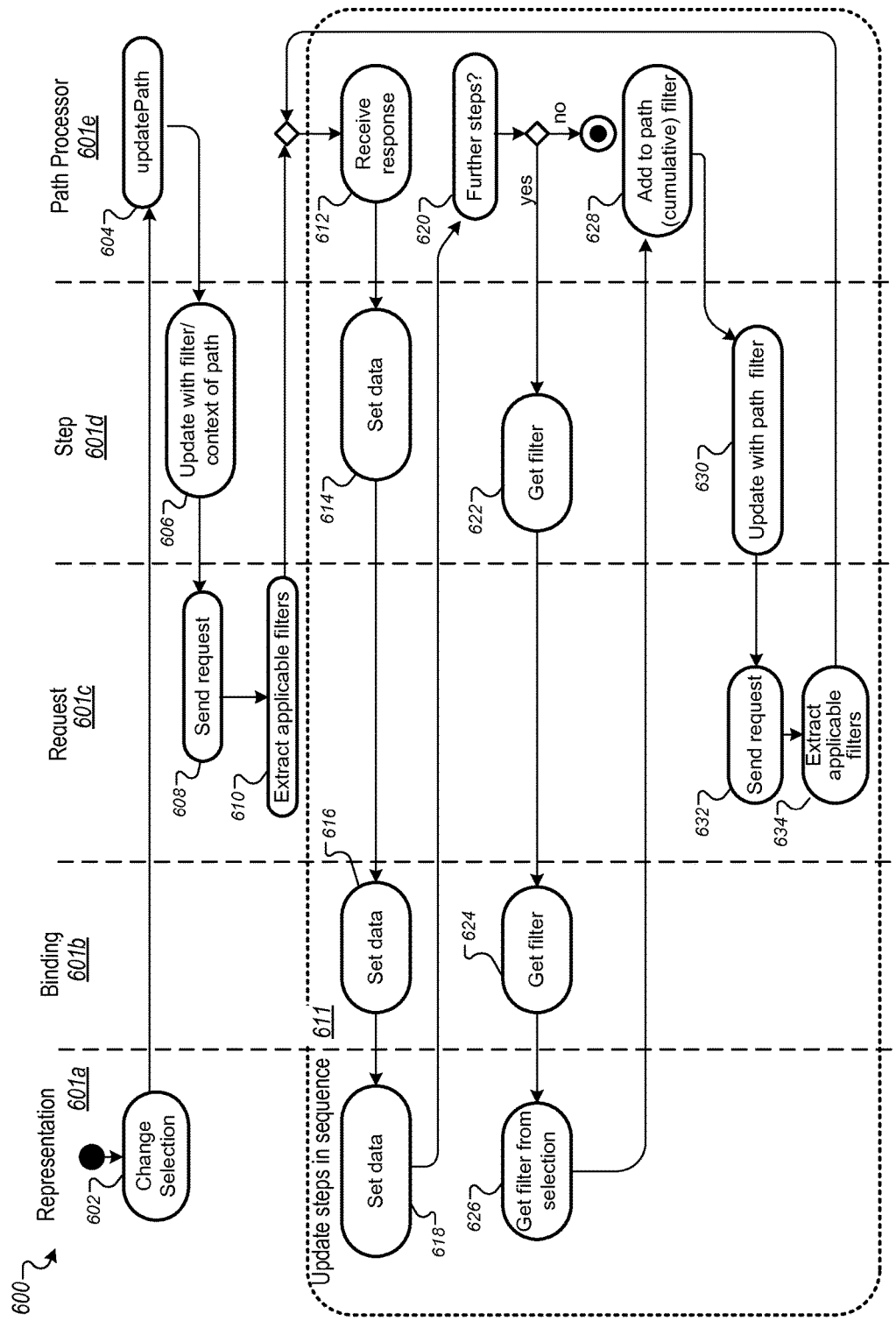
FIG. 6 is a swim lane diagram of example runtime behavior steps that occur when updating a path.

FIG. 6 is a swim lane diagram of example runtime behavior steps 600 that occur when updating a path. In some implementations, the runtime behavior steps 600 can be performed by (or can be associated with) components 601a-601e, as shown, with respective steps in respective swim lanes. At 602, a change selection is received from the user, such as while the user is using the application 504 to add a step to the path. At 604, the path is updated, e.g., by the processor 502 calling the method updatePath. At 606, actions are taken (e.g., by the processor 502) to update the path with a filter and a context. At 608, a request is sent (e.g., to the server 104) to provide available filters. At 610, the server 104, for example, extracts the applicable filters, and the user is presented with filter selection information, which initiates a step sequence 611 associated with updating the analysis path.

At 612, a response is received, e.g., including user input associated with the filter. At steps 614-618, data is set that is associated with the user selections. At 620, a determination is made whether further steps are needed. If so, then at 622-626, the filter selections are processed, and the filter information is added to the path at 628-630. At 632-634, another request is sent, applicable filters are extracted, and the step sequence 611 is repeated.

Figure 7:
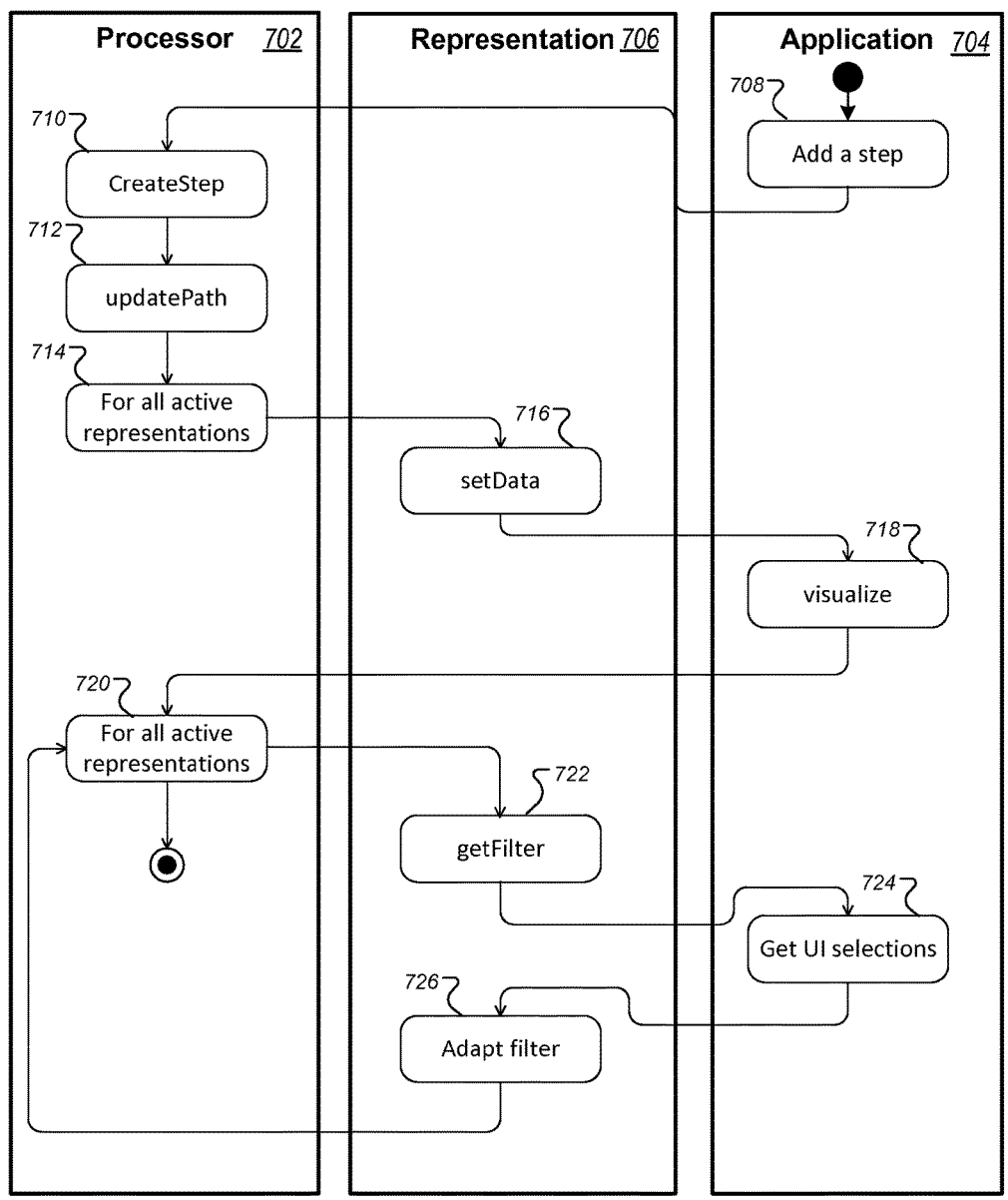
FIG. 7 is a diagram of example steps associated with user actions in an application.

FIG. 7 is a diagram of example steps 700 associated with user actions in an application. For example, the steps 700 can occur among a processor 702 and an application 704 and in association with a representation 706. The representation 706 is an object that belongs to the application 704 but is implemented using the processor API (e.g., through the representation interface). The representation 706 can prepare data for the processing or visualization in the application 704, and can map UI selections made on those data to filter objects of the processor 702.

At 708, a user, for example, can add a step. At 710, on the processor 702, the step is created, e.g., using the method createStep. At 712, the path is updated, e.g., using the method updatePath, at which point the active representations can begin to receive data.

At 714, as controlled by the processor 702, all visualizations are processed regarding presenting each visualization. At 716, the data associated with the visualization is set. At 718, visualization occurs on the application 704.

At 720, as controlled by the processor 702, all visualizations are processed regarding obtaining user filter-related inputs for each visualization. At 722, a request for a filter is processed. At 724, UI selections associated with the filter are obtained at the application 704. At 726, the filter is adapted for the current analysis path.

One or more representations can be set active. Each active representation can be provisioned with data, and during updatePath, the processor 702 can access the associated filter. When choosing and adding a step, for example, a user then can determine which representations are to be shown on the UI, e.g., including setting and using information as to which representations are "active" or "inactive". For example, a line chart and a column chart, if both active, can be visualized using the same data. Depending on which filters are active and selected, for example, it might become necessary to transfer the filter of the previously active representation to the next active representation. In some implementations, when multiple active representations of one step allow UI selections in each chart, then it can become necessary to transfer UI selections or filters among all active representations of one step so that selections are visualized consistently.

Figure 8:
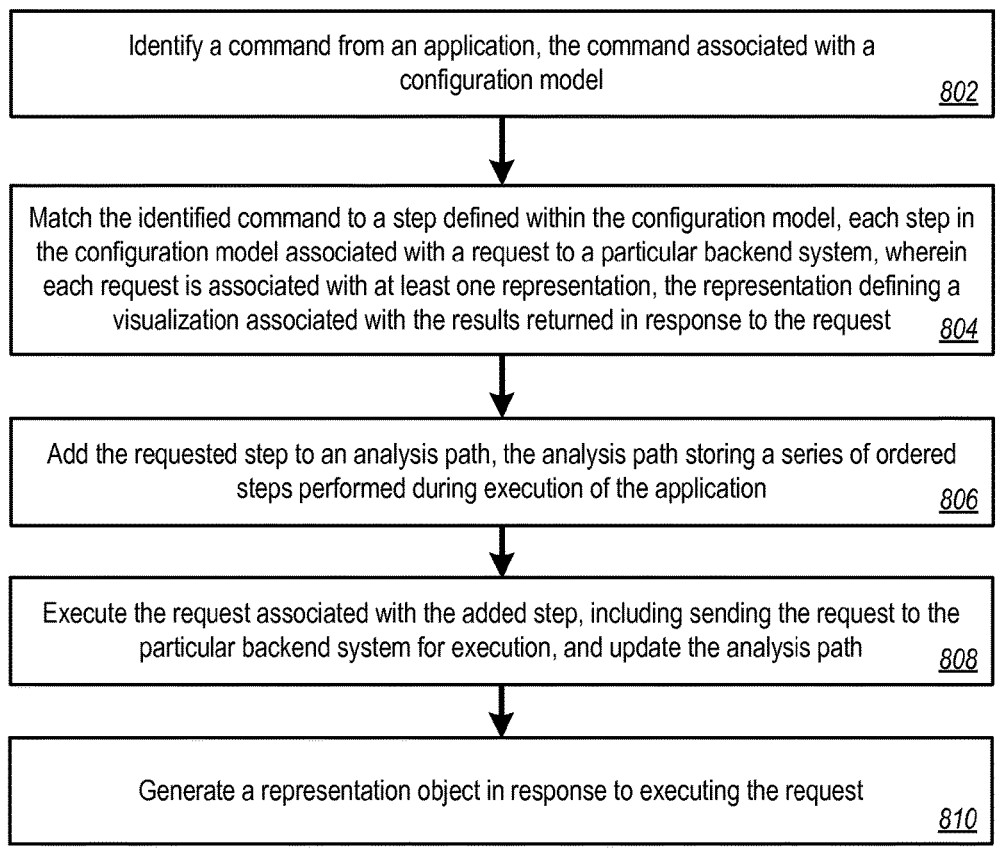
FIG. 8 is a flowchart of an example method for generating a representation object associated with an analysis path for a configuration model.

FIG. 8 is a flowchart of an example method 800 for generating a representation object associated with an analysis path for a configuration model. For clarity of presentation, the description that follows generally describes method 800 in the context of FIGS. 1-7. However, it will be understood that the method 800 may be performed, for example, by any other suitable system, environment, software, and hardware, or a combination of systems, environments, software, and hardware as appropriate. For example, the path processor 110 and/or its components can be used to execute the method 800.

At 802, a command is identified from an application, the command associated with a configuration model. For example, the path processor 110 can receive a command from the application UI 108 that is associated with a user selection, such as adding a step to an analysis path. The command can be received, for example, through the processor API 114.

In some implementations, the configuration model defines a plurality of step prototypes, each step prototype defining a binding between a request and at least one representation. For example, when using the application UI 108 to define a path, the user can be presented with controls that allow selection from available prototypes, each prototype being associated with a step 306 and having a corresponding request 312, a binding 314 and one or more representations 316.

In some implementations, prior to identifying an initial command from the application, an empty analysis path is created and an initial context is set. For example, the path processor 110 can create an empty path 302 that initially includes no steps 306.

At 804, the identified command is matched to a step defined within the configuration model, each step in the configuration model associated with a request to a particular backend system, wherein each request is associated with a least one representation, the representation defining a visualization associated with the results returned in response to the request. As an example, the path processor 110 can match the command received from the application UI 108 to an analysis path (e.g., as shown in FIG. 3) associated with the configuration model and that includes one or more steps. Each of the steps (e.g., steps 306) can have an associated request 312 for requesting data from the server 104. The data that is to be received in response to the request 312 is associated with one or more representations 316, as specified by the binding 314 associated with the particular step 306.

At 806, the requested step is added to an analysis path, the analysis path storing a series of ordered steps performed during execution of the application. For example, if the received command is to add a step to the analysis path, the added step can be one of the steps 306 associated with the path 302, as shown in FIG. 3.

At 808, the request associated with the added step is executed including sending the request to the particular backend system for execution. As an example, using information associated with the request 312, the path processor 110 can generate a request that is sent through the service 124 to the server 104.

In some implementations, prior to executing the request associated with the added step, requests associated with each of the preceding steps in analysis path are executed. For example, the path processor 110 can generate requests to the server 104 for each of the predecessor steps of the added step, e.g., based on the associated steps 306 and its corresponding request 312.

In some implementations, executing each of the preceding steps in the analysis comprises executing the preceding steps in order from the first step in the path to the added step. For example, the path processor 110 can execute the steps 306 in order as they appear in the path 302.

In some implementations, one or more steps in the analysis path includes one or more filters. For example, each of the steps 306 can include a filter 308, each filter 308 having one or more expressions 310.

In some implementations, added steps are executed using filters associated with preceding steps in the analysis path. For example, processing of step S begins with requesting the filter $F_{i-1}$ of the previous step, as described above.

At 810, a representation object is generated in response to executing the request. For example, based on response data received from the server 104, the path processor 110 can provide instructions for a representation to be presented in the application UI 108.

In some implementations, the method 800 further includes steps associated with moving a step in the analysis path. For example, a request is received to move a particular step (e.g., a step 306) to a new location in the analysis path (e.g., the path 302). The order of the analytical path is updated based on the request to move the particular step, e.g., to re-order steps 306 accordingly. The requests associated with each step are re-executed in order beginning with the first step in the analysis path. For example, analysis done by the path processor can start at the path 302 (e.g., root node of the path) and execute through the steps 306, in order.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method comprising:
   identifying a command from an application, the command associated with a configuration model;
   matching the identified command to a step defined within the configuration model, each step in the configuration model associated with a request to a particular backend system, wherein each request is associated with at least one representation, the representation defining a visualization associated with the results returned in response to the request;
   adding the requested step to an analysis path, the analysis path storing a series of ordered steps performed during execution of the application;
   executing the request associated with the added step including sending the request to the particular backend system for execution, and updating the analysis path; and
   generating a representation object in response to executing the request.

2. The method of claim 1, further comprising, prior to identifying an initial command from the application, creating an empty analysis path and setting an initial context.

3. The method of claim 1, wherein prior to executing the request associated with the added step, executing requests associated with each of the preceding steps in the analysis path.

4. The method of claim 3, wherein executing each of the preceding steps in the analysis comprises executing the preceding steps in order from the first step in the path to the added step.

5. The method of claim 1, wherein one or more steps in the analysis path include one or more filters determined by the representation object, and wherein the method further comprises, prior to executing the request, retrieving a filter from the representation.

6. The method of claim 1, wherein added steps are executed using filters associated with preceding steps in the analysis path.

7. The method of claim 1, further comprising:
   receiving a request to move a particular step to a new location in the analysis path;
   updating the order of the analytical path based on the request to move the particular step; and
   re-executing the requests associated with each step in order beginning with the first step in the analysis path.

8. The method of claim 1, wherein the configuration model defines a plurality of step prototypes, each step prototype defining a binding between a request and at least one representation.

9. A system comprising:
 memory storing:
  at least one configuration model defining a plurality of steps, each step associated with at least one backend request to a backend system and each step further associated with at least one representation corresponding to each backend request, the representation defining a visualization associated with the backend request; and
  a runtime data model comprising a runtime object defining an analysis path associated with at least one step from the configuration model and the execution of an application;
 an application for:
  receiving information associated with representations corresponding to steps in the configuration model;
  displaying representations and information for the configuration model in a user interface;
  receiving user inputs through the user interface relative to the representations and user selections associated with the configuration model; and
  sending user requests, each user request associated with a step from a particular configuration; and
 an analytical processor for:
  receiving user requests identifying a command from an application, the command associated with the configuration model, the command associated with adding, moving, removing or updating a particular step;
  matching the identified command to a step defined within the configuration model;
  adding the requested step in an analysis path, the analysis path storing a series of ordered steps performed during execution of the application, and updating the analysis path;
  providing the backend request associated with the requested step to the particular backend system for execution;
  generating a representation object in response to executing the backend request, the representation object for use in updating the visualization; and
  sending the representation object to the application.

10. The system of claim 9, wherein the analytical processor, prior to providing the backend request associated with the added step to the particular backend system for execution, executes requests associated with each of the preceding steps in the analysis path.

11. The system of claim 9, wherein one or more steps in the analysis path include one or more filters.

12. The system of claim 9, wherein steps are executed using filters associated with preceding steps in the analysis path.

13. The system of claim 9, the analytical processor further performing:
 receiving a request to move or remove a particular step in the analysis path;
 updating the order of the analytical path based on the request; and
 re-executing the requests associated with each step in order beginning with the first step in the analysis path.

14. The system of claim 9, wherein the configuration model defines a plurality of step prototypes, each step prototype defining a binding between a request and at least one representation, the binding defining required filter properties, and the representation, when requested, converts any user interface selection into a filter expressed over the required filter properties.

15. A computer-readable media, the computer-readable media comprising computer-readable instructions embodied on tangible, non-transitory media, the instructions operable when executed by at least one computer to:
 identify a command from an application, the command associated with a configuration model;
 match the identified command to a step defined within the configuration model, each step in the configuration model associated with a request to a particular backend system, wherein each request is associated with at least one representation, the representation defining a visualization associated with the results returned in response to the request;
 add the requested step to an analysis path, the analysis path storing a series of ordered steps performed during execution of the application;
 execute the request associated with the added step including sending the request to the particular backend system for execution; and
 generate a representation object in response to executing the request.

16. The computer-readable media of claim 15, wherein the instructions further include instructions for, prior to executing the request associated with the added step, executing requests associated with each of the preceding steps in the analysis path.

17. The computer-readable media of claim 15, wherein one or more steps in the analysis path include one or more filters.

18. The computer-readable media of claim 15, wherein added steps are executed using filters associated with preceding steps in the analysis path.

19. The computer-readable media of claim 15, the wherein the instructions further include instructions for:
 receiving a request to move a particular step to a new location in the analysis path;
 updating the order of the analytical path based on the request to move the particular step; and
 re-executing the requests associated with each step in order beginning with the first step in the analysis path.

20. The computer-readable media of claim 15, wherein the configuration model defines a plurality of step prototypes, each step prototype defining a binding between a request and at least one representation.

* * * * *